(12) United States Patent
Chang et al.

(10) Patent No.: US 6,188,590 B1
(45) Date of Patent: Feb. 13, 2001

(54) REGULATOR SYSTEM FOR CHARGE PUMP CIRCUITS

(75) Inventors: Kuen-Long Chang, Mucha Taipei; Chun-Hsiung Hung, Hsinchu; Weitong Chuang, Taichung, all of (TW)

(73) Assignee: Macronix International Co., Ltd., Hsinchu (TW)

( * ) Notice: Under 35 U.S.C. 154(b), the term of this patent shall be extended for 0 days.

(21) Appl. No.: 08/860,151

(22) PCT Filed: Dec. 18, 1996

(86) PCT No.: PCT/US96/20565

§ 371 Date: Jun. 17, 1997

§ 102(e) Date: Jun. 17, 1997

(87) PCT Pub. No.: WO98/27477

PCT Pub. Date: Jun. 25, 1998

(51) Int. Cl.[7] ..................................................... H02M 3/18
(52) U.S. Cl. ............................................................... 363/60
(58) Field of Search .................... 363/59, 60; 323/314, 323/315; 327/536, 537; 331/14, 17

(56) References Cited

U.S. PATENT DOCUMENTS

| 5,263,000 | 11/1993 | Van Buskirk et al. | 365/226 |
|---|---|---|---|
| 5,347,172 | 9/1994 | Cordoba et al. | 307/296.2 |
| 5,392,205 | 2/1995 | Zavaleta | 363/59 |
| 5,523,724 | * 6/1996 | Assar et al. | 331/1 A |
| 5,532,915 | 7/1996 | Pantelakis et al. | 363/60 |
| 5,553,295 | 9/1996 | Pantelakis et al. | 395/750 |
| 5,734,290 | * 3/1998 | Chang et al. | 327/536 |
| 5,740,213 | * 4/1998 | Dreyer | 375/374 |

* cited by examiner

Primary Examiner—Matthew Nguyen
(74) Attorney, Agent, or Firm—Mark A. Haynes; Haynes & Beffel LLP

(57) ABSTRACT

The present invention discloses a regulator system (112) for regulating the output current and voltage (Vout) of a charge pump circuit (104). It is observed that the output current and voltage (Vout) of a charge pump circuit (104) can be regulated by varying the amplitude and frequency of a set of clock signals (modulated clocks). The present invention comprises means (decoders 1, 2; AM, FM units) for generating a set of control signals (VAD1–VFDn) as the function of the output current and voltage (Vout). The set of control signals (VAD1–VFDn) is coupled to a clock signal generation circuit (130) that generates a set of clock signals (modulated clocks) having a magnitude and a frequency depending on this set of at least one control signal. This set of clock signals (modulated clocks) is then used to drive the charge pump circuit (104). It is found that this regulator circuit (112) consumes less power than prior art regulator circuits.

28 Claims, 9 Drawing Sheets

REGULATOR SYSTEM FOR CHARGE PUMP CIRCUITS

FIELD OF THE INVENTION

The present invention relates to charge pump circuits, and more particularly to a regulator system that can regulate the output voltage and current of charge pump circuits.

BACKGROUND OF THE INVENTION

A charge pump is a circuit that can generate an output voltage that is higher than the voltage supplied to the charge pump. One of the applications of charge pumps is to develop voltages for various modes of operation of flash EPROM (electrically programmable read only memory). The memory cells in flash EPROM are formed using so-called floating gate transistors in which the data is stored by charging or discharging the floating gate. These modes of operation generally require a high voltage.

The act of charging the floating gate is termed the "program" mode of a flash EPROM. This is typically accomplished using hot electron injection induced by establishing a large positive voltage between the gate and source, as much as 12 volts, and a positive voltage between the drain and source, for instance, 7 volts.

The act of discharging the floating gate is called the "erasing" mode of a flash EPROM. This erase function is typically carried out through Fowler-Nordheim tunneling induced by establishing a large positive voltage from the source to gate, while floating the drain of the memory cell. This positive voltage can be as much as 12 volts.

Some prior art flash EPROM devices require the application of an external high voltage in addition to a regular 3 or 5 volts supply voltage. Such an arrangement is undesirable because it complicates system design. Recently, many nonvolatile semiconductor memory device manufacturers (including flash EPROM manufacturers) place charge pumps on chips to generate the required high voltage for erasing and programming memory cells.

The output voltage of a charge pump needs to be regulated. Prior art systems use breakdown devices (such as zener diodes) or equivalent circuits that become conductive when voltage applied thereto exceeds a predetermined value. Although this arrangement can keep the output voltage below the predetermined value, a large amount of current needs to flow through the breakdown device. As a result, prior art regulator systems consume much power.

Because it is a low power system design, it is important to keep power consumption down. Consequently, there is a need to design a more efficient regulator system which consumes less power.

SUMMARY OF THE INVENTION

The present invention relates to a regulator system that can regulate the output current and voltage of a charge pump circuit. It is found that the output current drivability of many charge pump circuits can be adjusted by changing the amplitude and/or frequency of their associated driving clocks. This arrangement provides good regulation while power consumed by the inventive regulator is much lower than prior art regulators.

In providing for output circuit regulation to a charge pump circuit, the present invention comprises means for generating a set of at least one control signal as a function of the output current. The set of at least one control signal is coupled to a clock signal generation circuit that generates a set of clock signals having a respective magnitude and a frequency depending on this set of at least one control signal. This set of clock signals is then used to drive the charge pump circuit.

As an example, a higher clock signal amplitude or clock frequency will increase the output current driving capability of many charge pump circuits. Thus, if the actual output current is lower than desired, the set of clock signals needs to have a higher amplitude and/or higher frequency. As a result, the output current can be increased. Similarly, if the actual output current is higher than desired, the set of clock signals needs to have a lower amplitude and/or lower frequency.

In one embodiment of the present invention, the means for generating control signals comprises a plurality of current mirrors and associated transistors used as resistors. Various voltages are generated by currents in these current mirrors flowing through their associated transistors. These voltages are decoded into additional control signals.

The present regulator system further comprises an amplitude modulation (AM) circuit that generates a modulation voltage having a magnitude depending on these additional control signals. This regulator system also comprises a frequency modulation (FM) circuit that generates a clock signal having a frequency depending on these additional control signals. The modulation voltage and clock signal are applied to a clock generation circuit that generates multiple-phase clock signals having a variable magnitude. The multiple-phase clock signals are applied to a charge pump circuit. By changing the magnitude and frequency of these multiple-phase signals, the output current of the charge pump circuit can be regulated.

These and other features of the present invention will become apparent from the following description when read in conjunction with the drawings.

DETAILED DESCRIPTION

The present invention is directed to a novel power regulator system for charge pumps. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
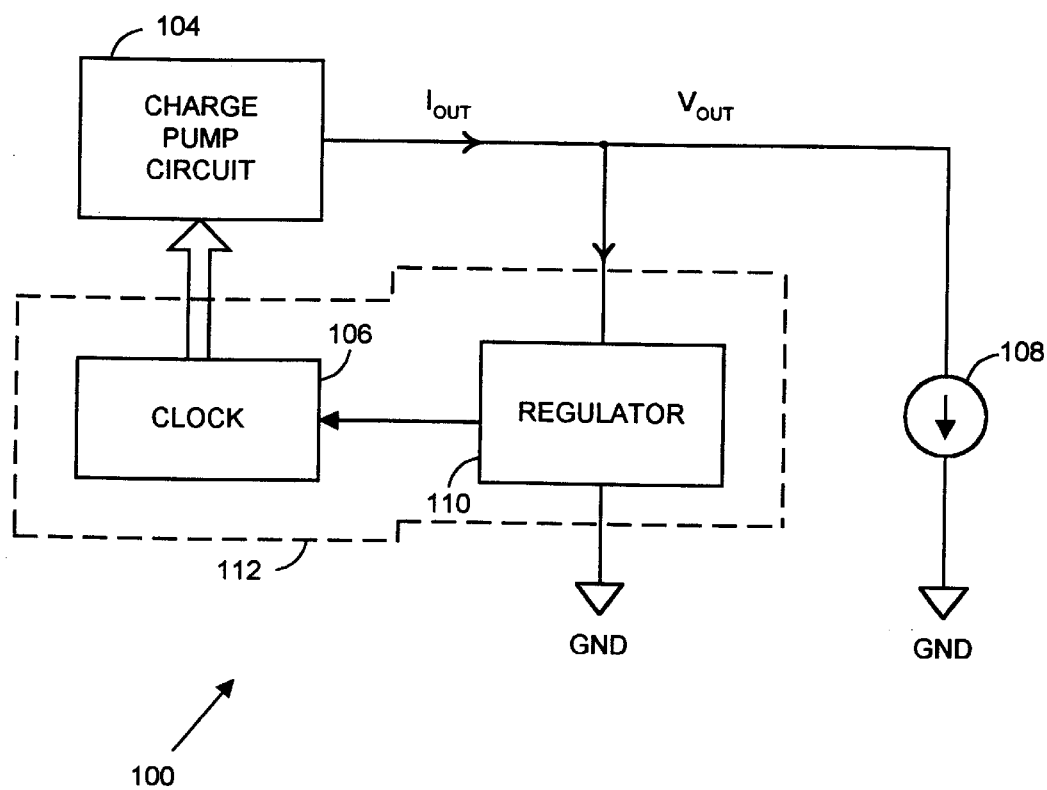
FIG. 1 is a block diagram of a charge pump system including a regulator system of the present invention.

FIG. 1 is a block diagram of a charge pump system 100 of the present invention. Charge pump system 100 comprises a charge pump circuit 104 which generates an output current $I_{out}$ at a voltage $V_{out}$ that is substantially above the voltage supplied to system 100 (shown in subsequent drawings as $V_{DD}$). Charge pump circuit 104 is controlled by a driving clock 106. The output of charge pump circuit 104 is used to drive a load 108. Charge pump system 100 further comprises a regulator 110 which monitors $I_{out}$ and $V_{out}$ and generates a control signal to control the operation of driving clock 106. As explained in detail below, the output current $I_{out}$ and voltage $V_{out}$ of charge pump circuit 104 can be regulated by regulator 110 and driving clock 106. In FIG. 1, regulator 110 and driving clock 106 are grouped together and called a regulator system 112.

It is desirable that regulator 110 can achieve the following results: (i) regulating the output voltage $V_{out}$ of charge pump circuit such that it is in a steady state with little or no ripple, and (ii) no or little current is consumed by regulator 110 so that substantially all of the output current $I_{out}$ is supplied to load 108.

Result (i) may be achieved by using a simple voltage damper (e.g., a zener diode). However, a typical voltage damper consumes large amount of power as a result of large current passing through the clamper. Consequently, it is not a desirable regulator.

It is found that most of the output current drivability of a charge pump circuit can be adjusted by changing the driving clock amplitude and/or frequency. This property allows the design of a regulator system with amplitude and frequency modulation feedback to control the amplitude and frequency of a driving clock. This driving clock is then used to control the output current driving capability of a charge pump circuit. The power consumption of this regulator is much less than that of a voltage clamper.

Figure 2:
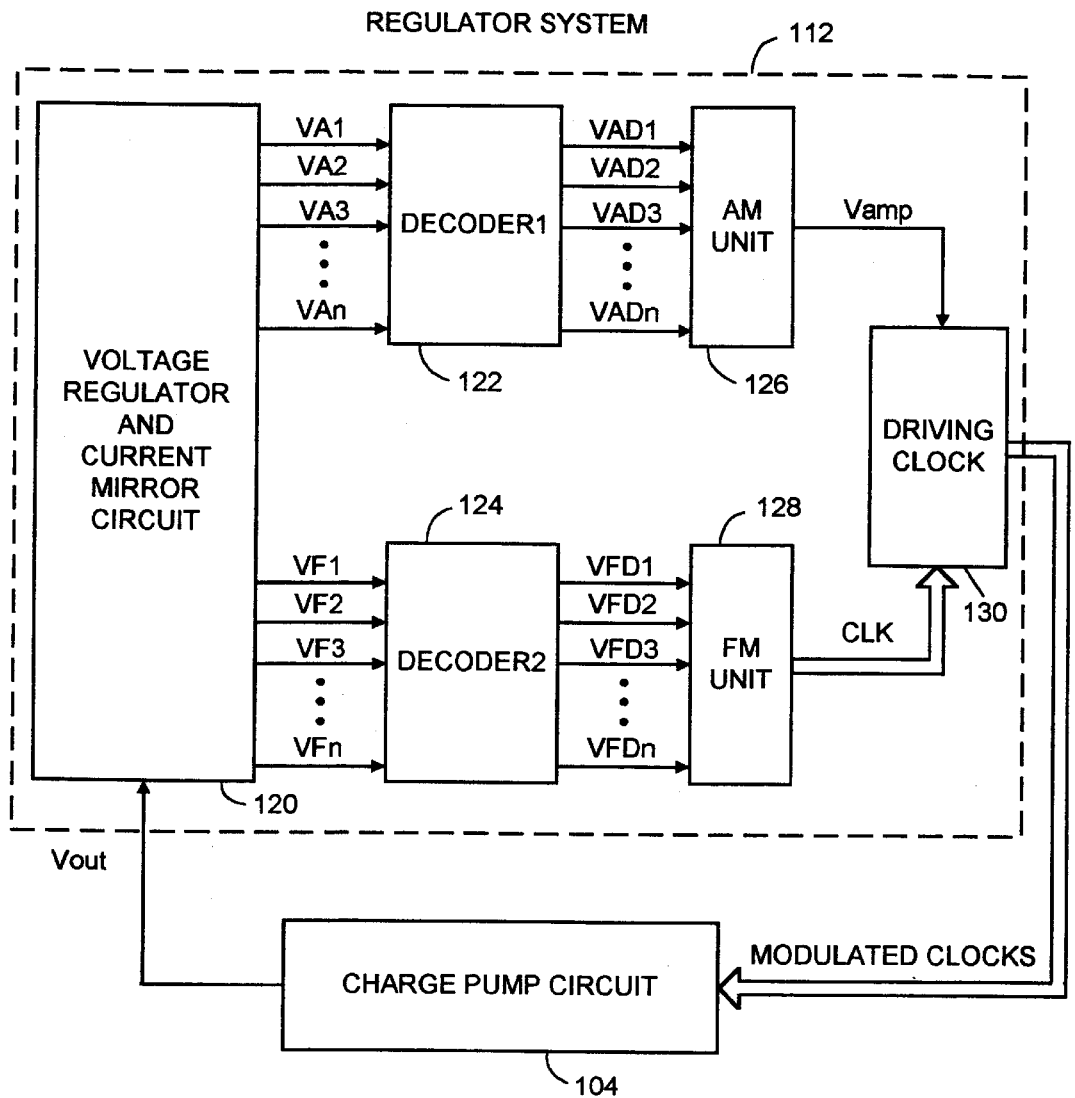
FIG. 2 is a block diagram showing the details of the regulator system of the present invention.

FIG. 2 is a block diagram showing the details of regulator system 112 of the present invention. Same elements in FIGS. 1 and 2 have the same reference numerals. Regulator system 112 comprises a voltage regulator and current mirror circuit 120, two decoders 122 and 124, an AM unit 126, an FM unit 128, and a driving clock circuit 130. Voltage regulator and current mirror circuit 120 senses whether there is excess current passing through it. If there is excess current, it issues a plurality of active amplitude modulation signals $V_{A1}$, $V_{A2}$, . . . , $V_{An}$ and/or a plurality of active frequency modulation signals $V_{F1}$, $VF_{F2}$, . . . , $V_{Fn}$. These two group of signals are connected to a first decoder 122 and a second decoder 124, and are changed into decoded signals $V_{AD1}$, $V_{AD2}$, . . . , $V_{ADn}$ and $V_{FD1}$, $V_{FD2}$, . . . , $V_{FDn}$, respectively. The decoded signals are then coupled to AM unit 126 and FM unit 128. AM unit 126 generates a voltage $V_{amp}$ (having a magnitude depending on $V_{AD1}$, $V_{AD2}$, . . . , $V_{ADn}$) for supplying power to driving clock 130. FM unit 128 generates a clock signal (CLK) having a frequency depending on $V_{FD1}$, $V_{FD2}$, . . . , $V_{FDn}$. This clock signal and voltage $V_{amp}$ is coupled to driving clock 130 for generating a clock signal with modulated amplitude and frequency. This modulated-clock is then fed to charge pump circuit 104 to tune the output current driving capability of charge pump circuit 104 for achieving a fixed output voltage $V_{out}$.

In one embodiment of the present invention, regulator system 112 is designed such that when more unwanted current passes through it, the magnitude of the $V_{amp}$ signal should be reduced and the frequency of the CLK signal should be lowered so as to generate a modulated clock signal to reduce the output current driving capability of charge pump circuit 104. As a result, power consumption can be reduced. Similarly, when there is a need for charge pump circuit 104 to generate more current, the magnitude of the $V_{amp}$ signal should be increased and the frequency of the CLK signal should be raised so as to generate a modulated clock signal to increase the output current driving capability of charge pump circuit 104.

Figure 3:
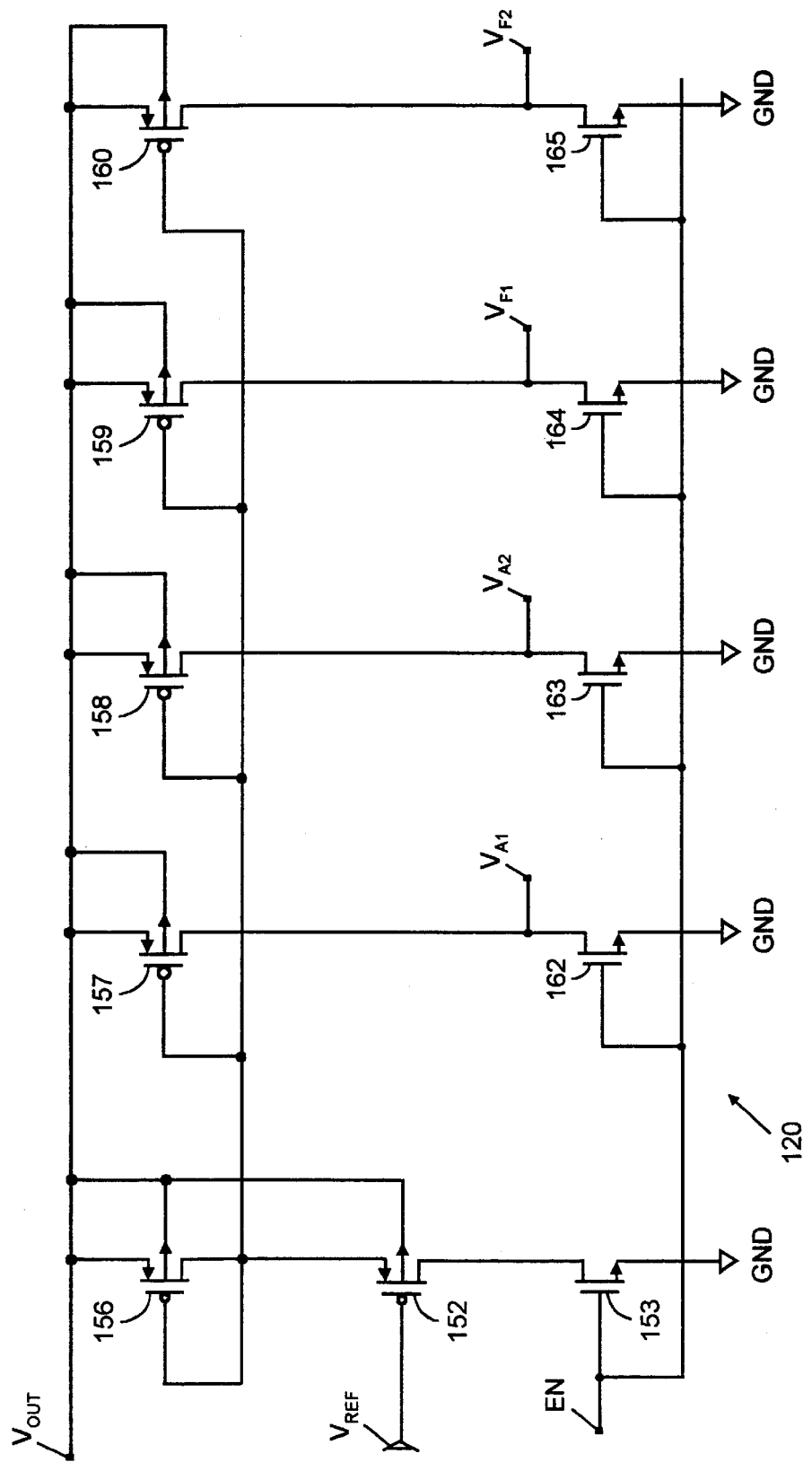
FIG. 3 is a schematic diagram of an embodiment of a voltage regulator and current mirror circuit of the present invention.

FIG. 3 shows a schematic diagram of an embodiment of voltage regulator and current mirror circuit 120. Preferred dimensions of some of the elements in circuit 120 can be found in Table 3 below. Circuit 120 comprises two transistors 152–153 used as a voltage regulator, five transistors 156–160 forming four current mirrors, and four transistors 162–165 functioning as resistors. The sources terminals of transistors 156–160 are connected to $V_{out}$, which is the output voltage of charge pump circuit 104. The gate terminal of transistor 152 is connected to a reference voltage $V_{ref}$. As a result, the voltage $V_{out}$ is clamped at a voltage of $V_{ref}$+ $|V_{GS(T156)}|+|V_{GS(T152)}|$, where T156 and T152 refer to transistors 156 and 152, respectively., and $V_{GS}$ refers to the gate to source voltage of the respective transistor. The gate terminal of transistor 153 is coupled to an enable signal (EN), which is used to enable the operation of voltage regulator and current mirror circuit 120.

As an example, when signal EN="1" and $V_{ref}$=7V, the maximum $V_{out}$=7V+$|V_{GS(T156)}|+|V_{GS(T152)}|$. If any current flows to the regulator path containing transistors 156, 152 and 153, the current will be sensed by the current mirrors. In the preferred embodiment, the channel widths of each of transistor 157–160 are approximately one-fifth that of transistor 156 while the channel length of transistors 156–160 are approximately equal. Consequently, the sensed current in each current mirror path is one-fifth the regulator current through transistors 156, 152 and 153. When the current of each current mirrors flows to the "unequal resistance elements" 162–165, it will result in different voltage drops in these elements. Note that transistor 162 has the longest channel length. As a result, the resistance of transistor 162 is larger than that of transistors 163–165. Thus, when the current through transistor 157 is large enough, the voltage $V_{A1}$ is the first "active modulation" signal (i.e., raised to "high") to modulate driving clock 130. If the passed current through transistors 156, 152 and 153 is increased, $V_{A2}$ will be the second "active modulation" signal to modulate driving clock 130. Note that $V_{A2}$ will be lower than $V_{A1}$. Moreover, if the sensed current is increased again, the $V_{F1}$ will be the third "active modulation" signal to modulate the driving clock frequency. Finally, the $VF_2$ is designed to be the fourth "active" signal to modulate the driving clock frequency again When $V_{F2}$ is activated, the driving clock frequency will be reduced. It should be emphasized that the current mirror branches can be extended indefinitely and the "active modulation" signals sequence can be rearranged, such as turning on $V_{F1}$ firstly and then the $V_{A2}$, $V_{F2}$, $V_{A1}$ (by changing the turn on resistances of transistors 162–165).

The function of decoders 122 and 124 is now described. They are used to convert the sequential "active modulation" signals (which come from voltage regulator and current mirror circuit 120) into non-sequential signals, which are used to drive AM unit 126 and FM unit 128. The truth tables of decoders 122 and 124 are listed in the Table 1 and 2, respectively. In these two truth tables, the logic values of $V_{A1}$, $V_{A2}$, $V_{F1}$, $V_{F2}$ are considered to be an "1" when their voltages exceed a predetermined value (such as $V_{DD}/2$) and to be a "0" otherwise. Note that it is impossible for the "active modulation" signals combination of this embodiment to be at the $V_{A1}=0$ and $V_{A2}=1$ state in Table 1. Similarly, the $V_{F1}=0$ and $V_{F2}=1$ state in Table 2 is also unattainable.

TABLE 1

| $V_{A1}$ | $V_{A2}$ | $V_{AD1}$ | $V_{AD2}$ | $V_{AD3}$ |
|---|---|---|---|---|
| 0 | 0 | 0 | 0 | 0 |
| 0 | 1 | x | x | x |
| 1 | 0 | 1 | 0 | 1 |
| 1 | 1 | 0 | 1 | 1 |

TABLE 2

| $V_{F1}$ | $V_{F2}$ | $V_{FD1}$ | $V_{FD2}$ |
|---|---|---|---|
| 0 | 0 | 0 | 0 |
| 0 | 1 | x | x |
| 1 | 0 | 1 | 0 |
| 1 | 1 | 1 | 1 |

Figure 4:
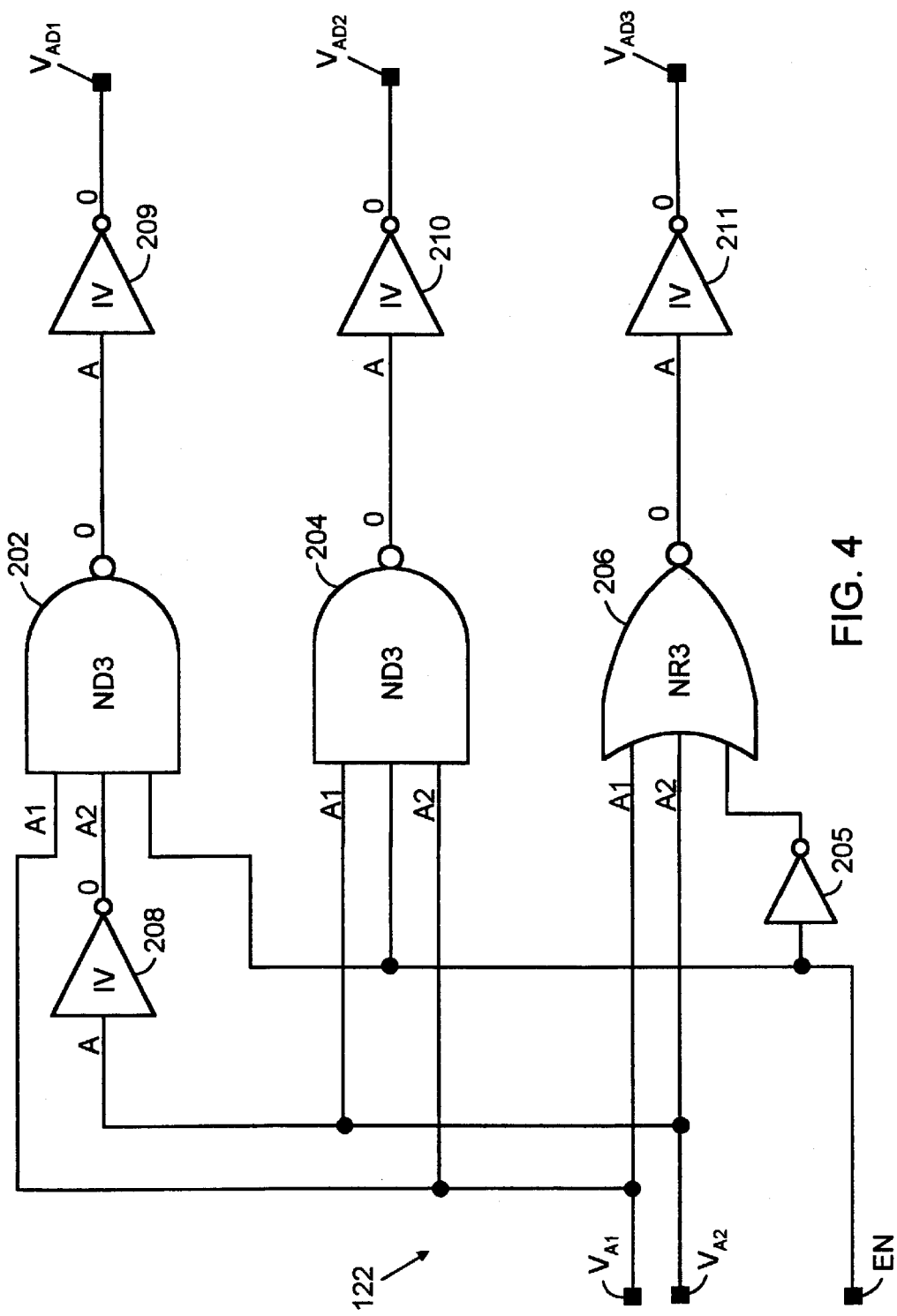
FIG. 4 is a schematic diagram of a first encoder of the present invention.

An embodiment of encoder 122 which can implement the truth table of Table 1 is shown in FIG. 4. Encoder 122 comprises two NAND gates 202, 204, a NOR gate 206, and five inverters 205, 208–211. Encoder 122 converts the $V_{A1}$ and $V_{A2}$ input signals to output signals $V_{AD1}$, $V_{AD2}$ and $V_{AD3}$. Note that signals $V_{A1}$ and $V_{A2}$ are floating when regulator system 120 is inactive. However, it is desirable that the outputs of encoder 122 have definite states. Consequently, the enable EN signal is coupled to the terminals of NAND gates 202 and 204 and, through an inverter 205, to the terminal of NOR gate 206. When EN=0 (i.e., regulator system 120 is inactive), gates 202, 204 are set to a high value and gate 206 is set to a low value.

Figure 5:
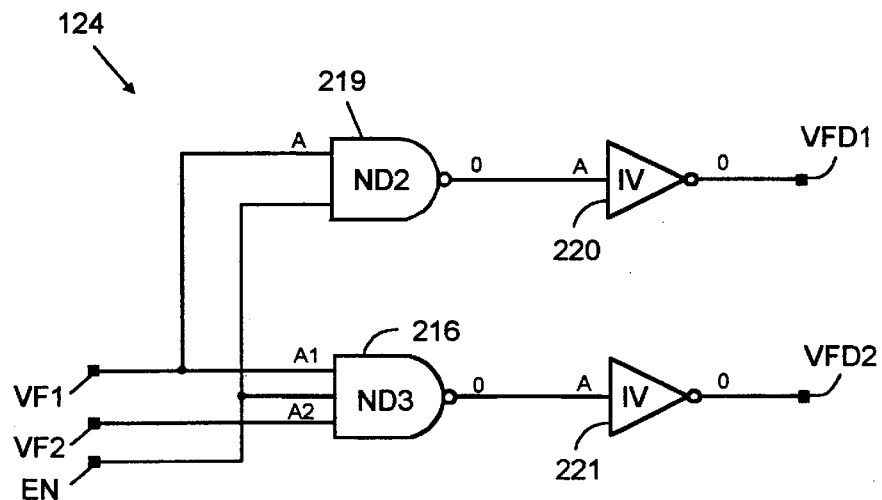
FIG. 5 is a schematic diagram of a second encoder of the present invention.

An embodiment of encoder 124 which can implement the truth table of Table 2 is shown in FIG. 5. Encoder 124 comprises two NAND gates (216, 219) and two inverters 220–221. Encoder 124 converts the $V_{F1}$ and $V_{F2}$ input signals to output signals $V_{FD1}$ and $V_{FD2}$. The enable EN signal is coupled to the terminals of NAND gates 216 and 219 so as to set these gates to a high value when the regulator system 120 is inactive (i.e., EN=0).

Figure 6:
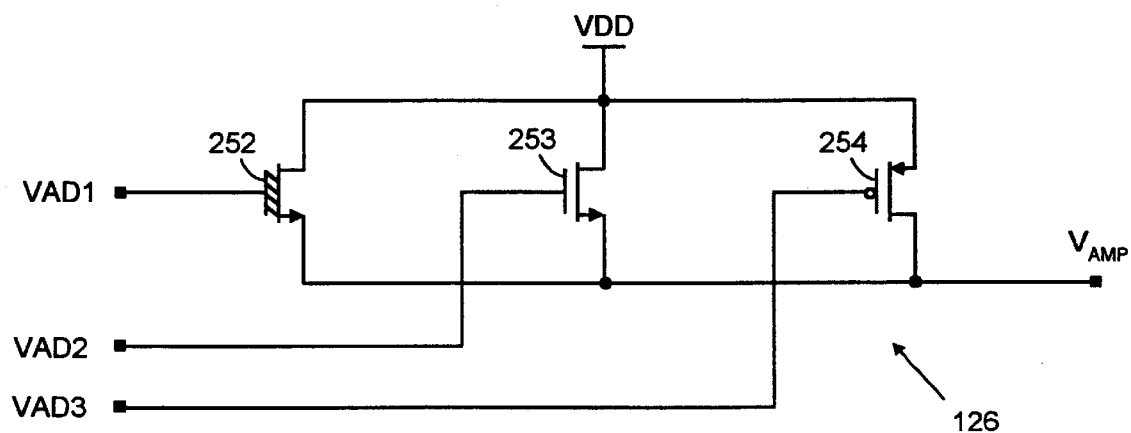
FIG. 6 is a schematic diagram of an AM unit of the present invention.

An embodiment of an AM unit 126 is shown in the FIG. 6. AM unit 126 comprises three transistors 252–254 connected to a power supply voltage $V_{DD}$. Transistor 252 is a native n-channel transistor. In this application, a "native" transistor refers to one having less dopant in its channel than an non-native transistor. In the normal case, $V_{AD1}=V_{AD2}=V_{AD3}=$"0". Thus, transistor 254 is turned on so that $V_{amp}=V_{DD}$. If $V_{AD1}=V_{AD3}=$"1" and $V_{AD2}=$"0", then transistor 252 is turned on and transistors 253 and 254 are turned off to make $V_{amp}=V_{DD}-V_{GS(T252)}$, where $V_{GS(T252)}$ is the gate to source voltage of transistor 252. When $V_{AD1}=$"0" and $V_{AD2}=V_{AD3}=$"1", transistor 253 is turned on and the other two transistors are turned off. In this case, $V_{amp}=V_{DD}-V_{GS(T253)}<V_{DD}-V_{GS(T252)}$, where $V_{GS(T253)}$ is the gate to source voltage of transistor 253, since the threshold voltage of native NMOS 252 is less than normal (enhancement) NMOS transistor 253. As a result, $V_{amp}$ could have three different voltage levels: $V_{DD}$, $V_{DD}-V_{GS(T252)}$ and $V_{DD}-V_{GS(T253)}$.

Figure 7A:
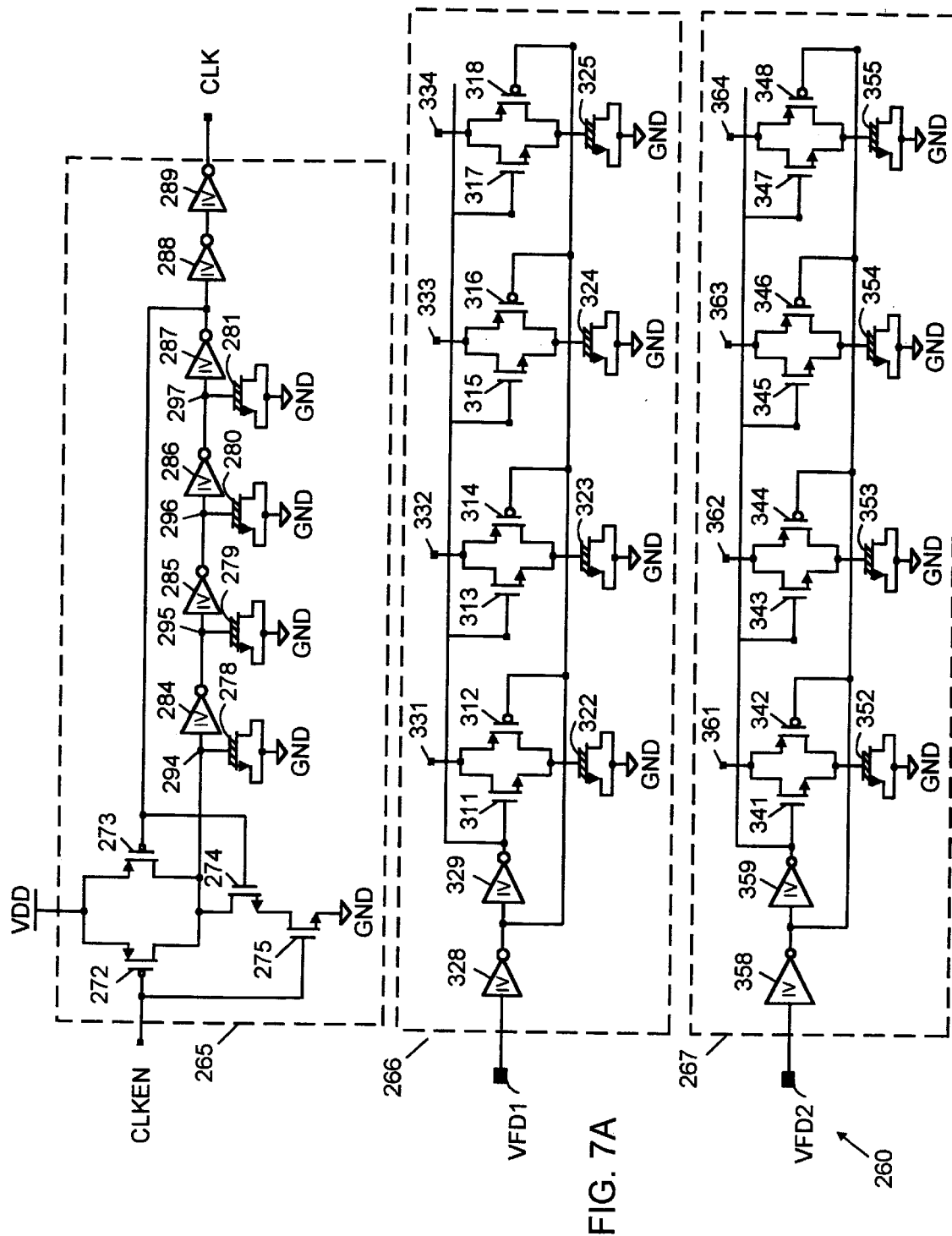
FIG. 7A is a schematic diagram of an FM unit of the present invention.

An embodiment of an FM unit of the present invention is shown in FIG. 7A. FM unit 260 comprises three major components 265–267. The first component 265 comprises four transistors 272–275, four native n-channel transistors 278–281, and six inverters 284–289. These transistors and inverters are arranged into a ring oscillator. The first component 265 also contains fours nodes 294–297, which are connected to four nodes 331–334, respectively, of the second component 266. The second component contains eight transistors 311–318, four native n-channel transistors 322–325, and two inverters 328 and 329. The native n-channel transistors are arranged as a capacitor train. The third component 267 comprises eight transistors 341–348, four native n-channel transistors 352–355, and two inverters 358 and 359. The native n-channel transistors are arranged as a capacitor train. Four nodes, 361–364 in the third component 267 are connected to four nodes, 294–297, respectively, of the first component 265.

A CLKEN signal (the clock enable signal) is used to enable the ring oscillator in the first component 265. The $V_{FD1}$ and $V_{FD2}$ signals are control signals (from encoder 124 of FIG. 5) used to affect the oscillation frequency of output signal CLK. If CLKEN="1" and $V_{FD1}=V_{FD2}=$"0", the CLK signal has the highest clock frequency, since the nodes 294–297 have the smallest capacitances coupled thereto. When $V_{FD1}$ is changed to "1", transistors 311–318 in the second components 266 are turned on. As a result, native n-channel transistors 322–325 are added to node 294–297 to slow down the oscillation frequency of the CLK signal. If both the $V_{FD1}$ and $V_{FD2}$ are "1", the CLK will have the slowest oscillation speed in this embodiment. Thus, by controlling the $V_{FD1}$ and $V_{FD2}$ signals, the CLK signal can be in one of the three oscillation frequencies.

Figure 7B:
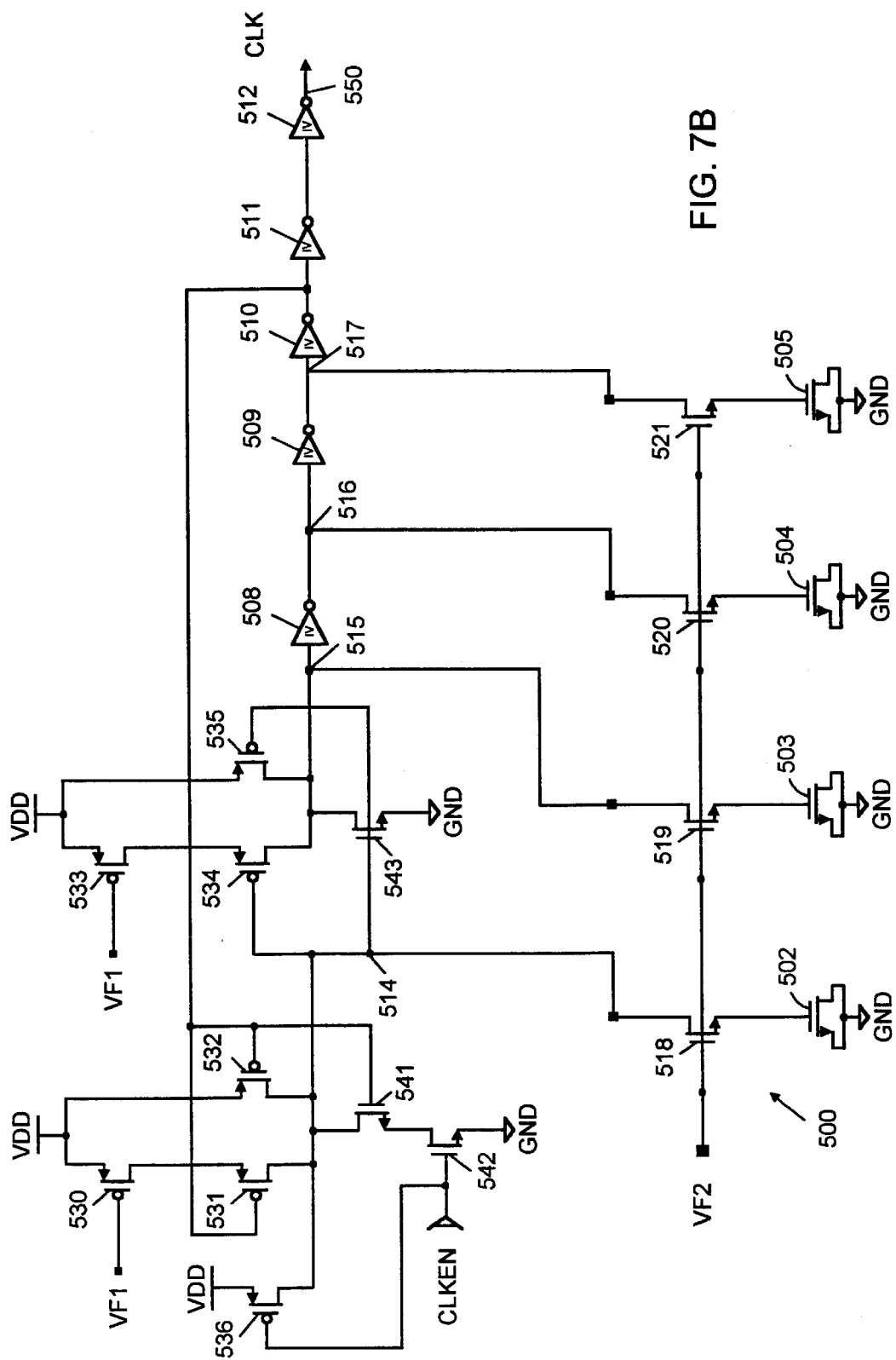
FIG. 7B is a schematic diagram of another FM unit of the present invention.

Another embodiment of an FM unit of the present invention is shown in FIG. 7B. In this embodiment, the analog signals $V_{F1}$ and $V_{F2}$ are directly connected to the FM unit 500. There is no need to use encoder 124 of FIG. 5 to convert the $V_{F1}$ and $V_{F2}$ into the $V_{FD1}$ and $V_{FD2}$ signals before coupling to FM unit 500.

FM unit 500 comprises seven PMOS transistors 530–536, three NMOS transistors 541–543 and five inverters 508–512. These circuit elements form an oscillator circuit. The gate terminals of transistors 530 and 533 are connected to the $V_{F1}$ signal. When the $V_{F1}$ signal is at ground, the path containing transistors 530 and 531 and the path containing transistors 533 and 534 are turned on. As a result, the path resistance from $V_{DD}$ to a node 514 and from $V_{DD}$ to a node 515 are the smallest. The rise time of pulses at nodes 514 and 515 is fast (i.e., the oscillation frequency of the CLK signal at the output terminal 550 is high). When the magnitude of the $V_{F1}$ signal gradually increases, the channel resistance of transistors 530 and 533 increase accordingly. As a result, the path resistance from $V_{DD}$ to node 514 and from $V_{DD}$ to node 515 increase. Thus, the rise time of the pulses at nodes 514 and 515 increases. Consequently, the oscillation frequency of CLK decrease.

FM unit 500 also comprises four transistors 502–505 and five inverters 508–512. Transistors 502–505 are coupled to a node 514 and the input terminals of inverters 508–510 through transistors 518–521, respectively. The gate terminals of transistors 518–521 are controlled by the $VF_2$ signal. When the $V_{F2}$ signal is at ground level, transistors 518–521 are turned off. Hence, there is little capacitance loading on nodes 514–517. The frequency of the CLK signal is high. When the value of the $V_{F2}$ signal gradually increases, the channel resistance of transistors 518–521 decrease. This effectively increases the capacitance loading on nodes

514–517. As a result, the oscillation frequency of the CLK signal decreases.

One difference between FM unit 500 and FM unit 260 is that the frequency of the clock signal CLK generated by FM unit 500 changes more smoothly.

Figure 8:
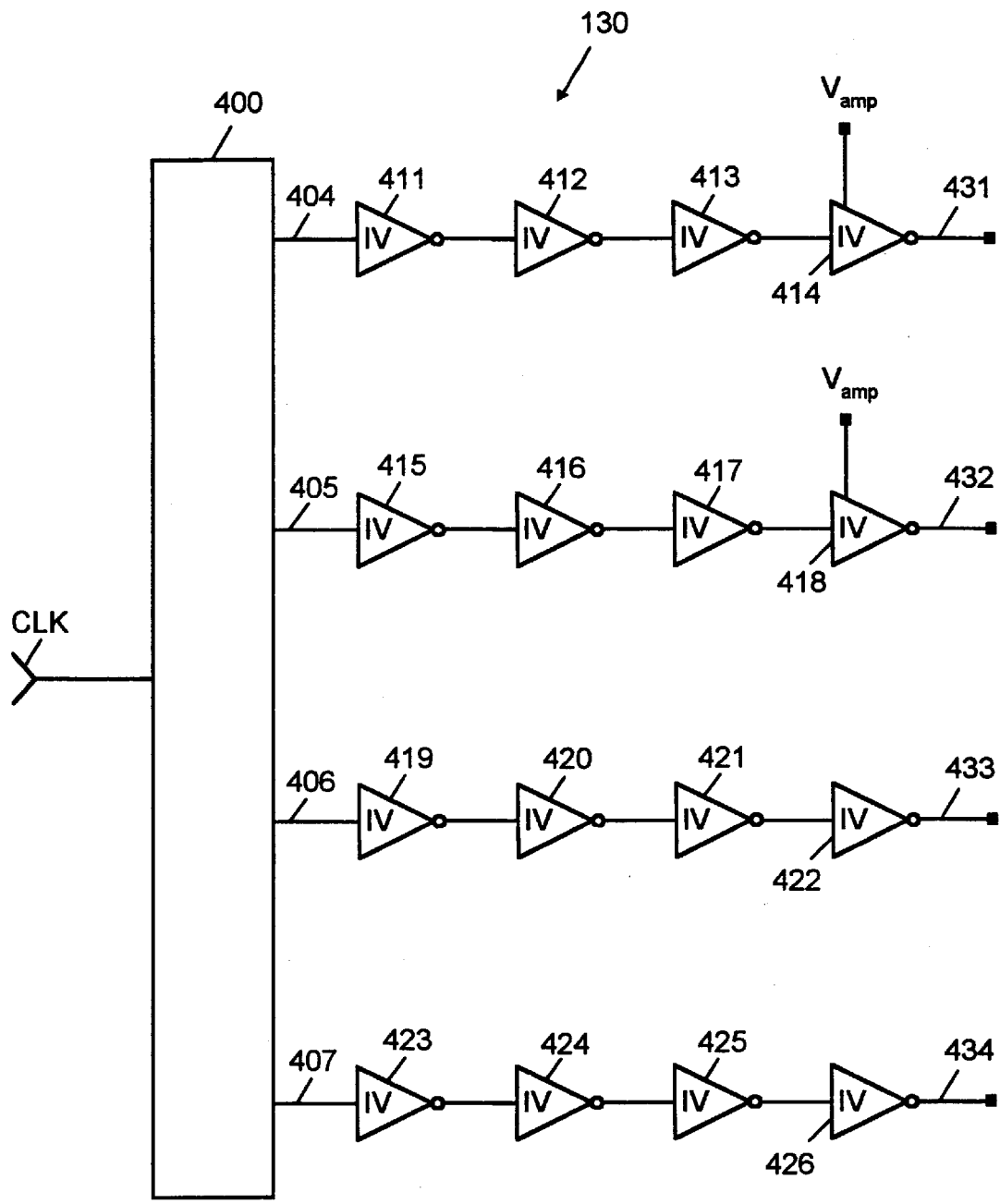
FIG. 8 is a schematic diagram of a driving clock of the present invention.

An embodiment of a driving clock 130 is shown in FIG. 8. In one embodiment of the present invention, charge pump circuit 104 is a four-stage circuit (i.e., it needs a four-phase clock to operate). Clock 130 contains a standard four-phase clock generation circuit 400 which accepts the CLK signal and generates four signals at lines 404–407 having appropriate phase relationships for driving charge pump circuit 104. The frequency of the four-phase signal is determined by the CLK signal. Driving clock 130 comprises sixteen inverters 411–426 which are used as buffer stages to drive the large capacitances of the pumping circuit in charge pump circuit 104. Voltage $V_{amp}$ (generated by AM unit 126 of FIG. 5) is applied to inverters 414 and 418 to perform the driving clocks amplitude modulation. Note that voltage $V_{amp}$ can be applied to any of sixteen inverters. However the AM unit device size must increase in order to guarantee the buffers pull up (i.e., output go "high") capability is strong enough if voltage $V_{amp}$ is applied to more inverters. Thus, if too many drivers' power source comes from $V_{amp}$, it will have the chip size penalty.

Figure 9:
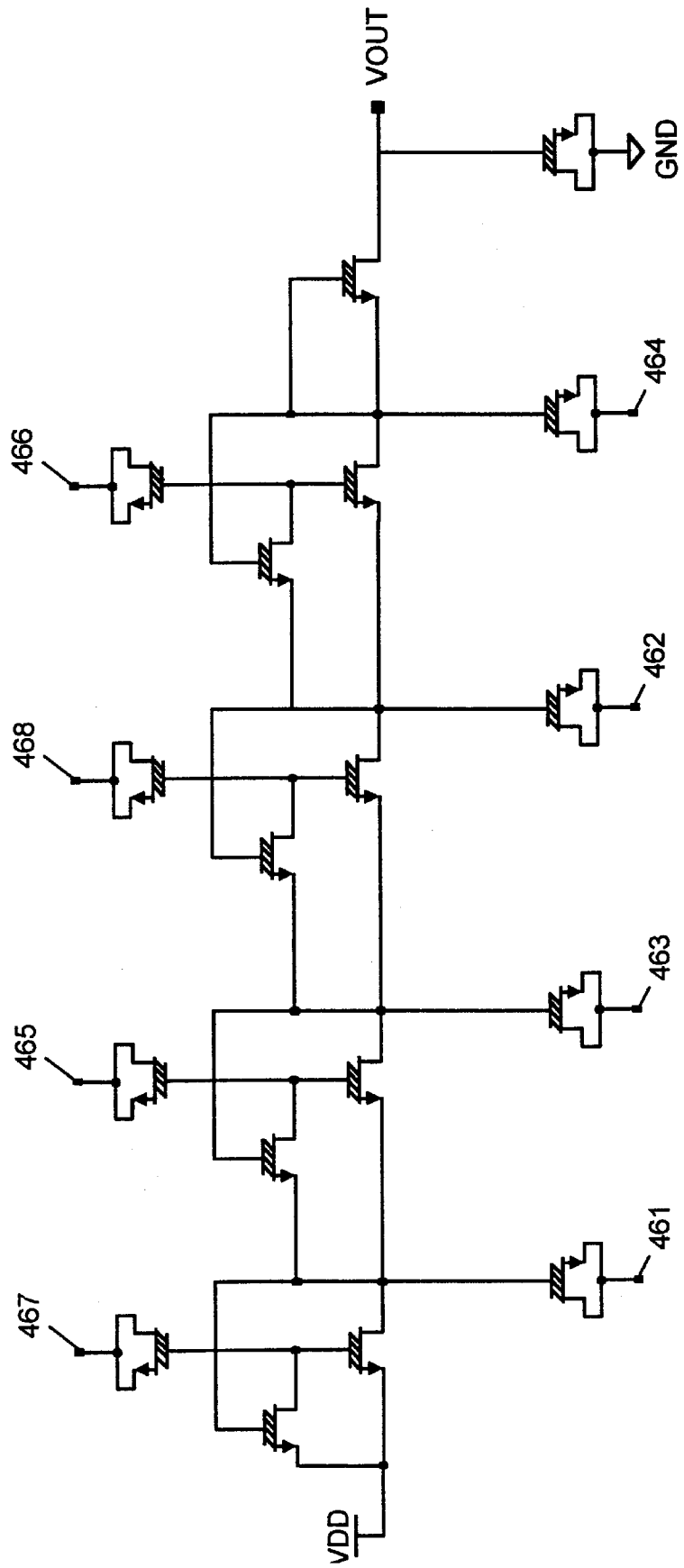
FIG. 9 is a schematic diagram of a charge pump circuit that can be used in the present invention.

FIG. 9 is a schematic diagram of a charge pump circuit 104 that can be used in the present invention. Charge pump circuit 104 is of conventional design, and will not be described in detail here. In this embodiment, all the transistors are native n-channel transistors. Output line 431 of driving clock 130 of FIG. 8 is connected to lines 461 and 462 of FIG. 9; output line 432 of driving clock 130 is connected to lines 463 and 464 of FIG. 9 and output line 433 of driving clock 130 is connected to lines 465 and 466 of FIG. 9; output line 434 of driving clock 130 is connected to lines 467 and 468 of FIG. 9. In this charge pump circuit, the output current is increased when the driving clock frequency and/or amplitude increase. In charge pump circuit 104, lines 461–464 are connected to the main path. Referring to FIG. 8, the modulated clock signal connected to the main path are modulated by the amplitude $V_{amp}$. It should be noted that the present invention is operative even if all the modulated clock signals are modulated by the amplitude $V_{amp}$.

Table 3 is a table showing the dimensions of the transistors used in one preferred example of a current implementation of the present invention.

TABLE 3

| Transistors | Channel Width ($\mu$m) | Channel Length ($\mu$m) |
|---|---|---|
| 152 | 100 | 1.2 |
| 153 | 50 | 1.2 |
| 156 | 100 | 1.2 |
| 157 | 20 | 1.2 |
| 158 | 20 | 1.2 |
| 159 | 20 | 1.2 |
| 160 | 20 | 1.2 |
| 162 | 3 | 100 |
| 163 | 3 | 80 |
| 164 | 3 | 60 |
| 165 | 3 | 40 |
| 252 | 500 | 0.8 |
| 253 | 500 | 0.8 |
| 254 | 1000 | 0.8 |
| 272 | 20 | 0.8 |
| 273 | 5 | 5 |
| 274 | 5 | 5 |

TABLE 3-continued

| Transistors | Channel Width ($\mu$m) | Channel Length ($\mu$m) |
|---|---|---|
| 275 | 10 | 0.8 |
| 278 | 10 | 10 |
| 279 | 10 | 10 |
| 280 | 10 | 10 |
| 281 | 10 | 10 |
| 312 | 8 | 0.8 |
| 313 | 4 | 0.8 |
| 314 | 8 | 0.8 |
| 315 | 4 | 0.8 |
| 316 | 8 | 0.8 |
| 317 | 4 | 0.8 |
| 318 | 8 | 0.8 |
| 322 | 10 | 10 |
| 323 | 10 | 10 |
| 324 | 10 | 10 |
| 325 | 10 | 10 |
| 341 | 4 | 0.8 |
| 342 | 8 | 0.8 |
| 343 | 4 | 0.8 |
| 344 | 8 | 0.8 |
| 345 | 4 | 0.8 |
| 346 | 8 | 0.8 |
| 347 | 4 | 0.8 |
| 348 | 8 | 0.8 |
| 352 | 10 | 10 |
| 353 | 10 | 10 |
| 354 | 10 | 10 |
| 355 | 10 | 10 |
| 502 | 8 | 8 |
| 503 | 8 | 8 |
| 504 | 8 | 8 |
| 505 | 8 | 8 |
| 518 | 4 | 0.5 |
| 519 | 4 | 0.5 |
| 520 | 4 | 0.5 |
| 521 | 4 | 0.5 |
| 530 | 10 | 1 |
| 531 | 10 | 1 |
| 532 | 5 | 10 |
| 533 | 10 | 1 |
| 534 | 10 | 1 |
| 535 | 5 | 10 |
| 536 | 3 | 5 |
| 541 | 5 | 5 |
| 542 | 5 | 5 |
| 543 | 5 | 10 |

The invention has been described with reference to specific exemplary embodiments thereof. Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A regulator system for regulating output current of a charge pump circuit, said output current having a magnitude being controlled by a set of clock signals coupled to said charge pump circuit, said regulator system comprising:

a control circuit which generates a set of at least one control signal as a function of said output current; and a clock circuit which generates said set of clock signals having a magnitude and a frequency, said magnitude depending on said set of at least one control signal;

said set of clock signals being applied to said charge pump circuit thereby varying said magnitude of said output current.

2. A regulator system for regulating output current of a charge pump circuit, said output current having a magnitude being controlled by a set of clock signals coupled to said charge pump circuit, said regulator system comprising:

a control circuit which generates a set of at least one control signal as a function of said output current; and a clock circuit which generates said set of clock signals having a magnitude and a frequency, at least one of said magnitude and said frequency depending on said set of at least one control signal;

said set of clock signals being applied to said charge pump circuit thereby varying said magnitude of said output current;

wherein said set of at least one control signal contains a first and a second control signal, said control circuit comprising:

a sense circuit which generates a first set of voltage signals as a function of said output current;

a first circuit for generating said first control signal having a magnitude depending on said first set of voltages; and a second circuit for generating said second control signal having a frequency depending on said first set of voltages.

3. The regulator system of claim 2 wherein said sense circuit comprises:

a plurality of current mirrors for generating a set of currents as a function of said output current; and a plurality of resistive elements each connected to a corresponding one of said plurality of current mirrors for generating said set of first voltage signals when said set of currents flow through said set of resistive elements.

4. The regulator system of claim 3 wherein at least one of said resistive elements comprises a transistor.

5. The regulator system of claim 3 wherein said resistive elements have unequal resistance while said set of currents are equal, thereby generating said first set of voltage signals having unequal voltage levels.

6. The regulator system of claim 2 further comprising means for maintaining an output voltage of said charge pump circuit at a predetermined value.

7. The regulator system of claim 3 wherein said plurality of current mirrors comprise a plurality of transistors coupled to said output current.

8. The regulator system of claim 2 wherein said first circuit further comprises:

a first decoder for generating a second set of voltage signals as a function of said first set of voltage signals, said second set of voltage signals being non-sequential; and an amplitude modulation unit for generating said first control signal as a function of said second set of voltage signals.

9. The regulator system of claim 2 wherein said second circuit further comprises:

a second decoder for generating a third set of voltage signals as a function of said first set of voltage signals, said third set of voltage signals being non-sequential; and a frequency modulation unit for generating said second control signal as a function of said third set of voltage signals.

10. The regulator system of claim 8 wherein said first decoder comprises at least one logic circuit element.

11. The regulator system of claim 10 wherein said first decoder comprises at least one gate performing an OR function and at least one gate performing an AND function on said at least two members of said first set of voltage signals.

12. The regulator system of claim 9 wherein said second decoder comprises at least one logic circuit element.

13. The regulator system of claim 12 wherein said second decoder comprises at least one gate performing an AND function on said at least two members of said first set of voltage signals.

14. The regulator system of claim 8 wherein said amplitude modulation unit comprises a plurality of transistors, said transistors being turned on based on levels of said second set of voltage signals.

15. The regulator system of claim 14 wherein said transistor have their gate terminals connected to said second set of voltage signals and one of their source and drain terminals connected to a supply voltage.

16. The regulator system of claim 9 wherein said frequency modulation unit comprising:

a ring oscillator for generating a modulated clock signal having a oscillation frequency depending on capacitance at selected nodes;

at least one capacitor; and means responsive to said third set of voltage signals for coupling said capacitor to one of said selected nodes of ring oscillator thereby modulating said oscillation frequency.

17. The regulator system of claim 16 wherein said capacitor comprises a field effect transistor.

18. The regulator system of claim 16 wherein said means for coupling comprises a transistor.

19. The regulator system of claim 1 wherein said charge pump circuit is a multi-stage charge pump circuit and said clock circuit comprises means for generating a set of multi-phase clock signals.

20. The regulator system of claim 16 further comprising at least one buffer coupled to at least one of said set of clock signals, said one buffer being controlled by said first control signal.

21. The regulator system of claim 20 wherein first control signal is used as a supply voltage of said one buffer.

22. A method for regulating output current of a charge pump circuit, said output current having a magnitude controlled by a set of clock signals coupled to said charge pump circuit, said method comprising the steps of:

generating a set of at least one control signal as a function of said output current;

generating said set of clock signals having a magnitude and a frequency, said magnitude depending on said set of at least one control signal; and applying said set of clock signals to said charge pump circuit thereby varying said magnitude of said output current.

23. A method for regulating output current of a charge pump circuit, said output current having a magnitude controlled by a set of clock signals coupled to said charge pump circuit, said method comprising the steps of:

generating a set of at least one control signal as a function of said output current;

generating said set of clock signals having a magnitude and a frequency, at least one of said magnitude and said frequency depending on said set of at least one control signal; and applying said set of clock signals to said charge pump circuit thereby varying said magnitude of said output current;

wherein said set of at least one control signal contains two control signals, and wherein said step of generating said set of at least one control signal comprises;

generating a first set of voltage signals as a function of said output current;

generating a first control signal having a magnitude depending on said first set of voltages; and generating a second control signal having a frequency depending on said first set of voltages.

24. The method of claim 23 wherein said step of generating said first control signal comprises the steps of:

providing a first decoder for generating a second set of voltage signals as a function of said first set of voltage signals, said second set of voltage signals being non-sequential; and generating said first control signal having a magnitude as a function of said second set of voltage signals.

25. The method of claim 24 wherein said step of generating said second control signal comprises the steps of:

providing a second decoder for generating a third set of voltage signals as a function of said first set of voltage signals, said third set of voltage signals being non-sequential; and generating said second control signal having a frequency as a finction of said third set of voltage signals.

26. A regulator system for regulating output current of a charge pump circuit, said output current having a magnitude being controlled by a set of clock signals coupled to said charge pump circuit, said regulator system comprising:

a plurality of current mirrors for generating a set of currents as a function of said output current;

a plurality of resistive elements each connected to a corresponding one of said plurality of current mirrors for generating a set of first voltage signals when said set of currents flow through said set of resistive elements;

a first decoder for generating a second set of voltage signals as a function of said first set of voltage signals, said second set of voltage signals being non-sequential;

an amplitude modulation unit for generating a first control signal as a function of said second set of voltage signals;

a second decoder for generating a third set of voltage signals as a function of said first set of voltage signals, said third set of voltage signals being non-sequential;

a frequency modulation unit for generating a second control signal as a function of said third set of voltage signals; and an oscillator generating said set of clock signals in response to said first and said second control signals;

said set of clock signals being applied to said charge pump circuit thereby varying said magnitude of said output current.

27. A regulator system for regulating output current of a charge pump circuit, said output current having a magnitude being controlled by a set of clock signals coupled to said charge pump circuit, said regulator system comprising:

a control circuit which generates a set of at least one control signal as a function of said output current; and a clock circuit which generates said set of clock signals having a magnitude and a frequency, said magnitude and said frequency depending on said set of at least one control signal;

said set of clock signals being applied to said charge pump circuit thereby varying said magnitude of said output current.

28. A method for regulating output current of a charge pump circuit, said output current having a magnitude controlled by a set of clock signals coupled to said charge pump circuit, said method comprising the steps of:

generating a set of at least one control signal as a function of said output current;

generating said set of clock signals having a magnitude and a frequency, said magnitude and said frequency depending on said set of at least one control signal; and applying said set of clock signals to said charge pump circuit thereby varying said magnitude of said output current.

* * * * *